3,508,927
USE OF UNSATURATED ORGANIC ACIDS AS
BACTERIAL GROWTH PROMOTERS
John F. Herndon, Bethesda, Md., and Michael B. Perkins
and Nicholas J. Stevens, Colonia, and John D. Douros,
Jr., Millington, N.J., assignors to Esso Research and Engineering Company, a corporation of Delaware
No Drawing. Filed Sept. 15, 1965, Ser. No. 487,584
Int. Cl. A23k 1/00; C12d 13/06
U.S. Cl. 99—9                                    8 Claims

ABSTRACT OF THE DISCLOSURE

In a fermentation process using a hydrocarbon as the source of carbon growth stimulants are added to the fermentation zone, the growth stimulants being selected from the class of unsaturated organic compounds consisting of acrylic acid, fumaric acid and oleic acid.

This invention relates, in general, to an improved continuous process for growing bacteria on a hydrocarbon feed.

More particularly, this invention relates to a long term continuous process for growing microorganisms which comprises continuously supplying a liquid or gaseous hydrocarbon feed, a liquid aqueous mineral salts medium and excess oxygen-containing gas to a stirred reactor containing said feed, aqueous medium, an inoculant of aerobic bacteria capable of growing on said hydrocarbons, and a suitable amount of an unsaturated compound which has a catalytic effect on the growth reaction and which serves as the sole carbon source for said growth reaction, continuously withdrawing a portion of the reaction mixture at a rate to maintain suitable liquid residence times, separating microorganisms from the withdrawn mixture and finally drying the microorganisms to obtain directly a desirable high protein biological product. In a preferred embodiment, this invention relates to carrying out this process utilizing as the feed a selected cut from a $C_{11}$ to $C_{30}$ paraffinic petroleum feed which has been purified to reduce the level of aromatics to below ½ wt. percent, utilizing as the bacteria *Arthrobacter ureafaciens*, utilizing optimum non-limiting inorganic salts reaction mediums to obtain high selectivity to bacteria and utilizing as the catalytically active unsaturated compound, e.g., a $C_{12}$–$C_{22}$ unsaturated carboxylic acid or a $C_{11}$–$C_{30}$ olefinic hydrocarbon.

There presently exists a world shortage of protein, especially low cost animal proteins which are suitable for consumption by animals as well as humans. In an attempt to alleviate this protein shortage, there have been developed recently several biosynthesis procedures whereby living protein can be provided by the growth of bacteria on various carbon-containing substrate materials especially those which are relatively inexpensive. One of the promising techniques of biosynthesis involves growing various yeast or bacteria on carbohydrate substrates. However, most of these biosyntheses require expensive vitamins and other growth mediums in order to insure the desired bacteria growth.

Another recent and even more promising technique for biologically synthesizing food protein is the culture of microorganisms on petroleum substrates. This latter type of protein synthesis is usually conducted in an aqueous biosynthesis bath containing a hydrocarbon feed media, an inoculant of the bacteria to be grown, and an aqueous growth medium in addition to oxygen and other indispensable nutrients. This type of protein biosynthesis allows the use of hydrocarbon feeds, which are even less expensive than carbohydrates, and does not usually require expensive growth factors such as vitamins, etc., to be supplied in order to insure proper bacteria cell growth. This failure to maintain a continuous growth of the bacteria usually follows the same pattern, for example, normal batch growth in order to increase cell population to the desired level, i.e., about 1% (and apparently stable continuous operation for periods of, e.g., 6 to 12 hours or 1 to 6 residence times), followed by a steady decline in growth rate. Frequently, after such declines the cell population could not be returned to desired level even by batch operation. In addition, morphology of the organism employed is usually declined progressively, for example, in the instance of *Arthrobacter ureafaciens* from a normal spherical shape to a diploid form and occasionally to a lysed appearance. Further disadvantageous phenomena evidence themselves such as liquid-phase color changes. Most seriously, however, during this decline the microorganisms reacted adversely to minor upsets in operation and were highly susceptable to inroads by contamination.

The failure to maintain a long term continuous growth results in unsatisfactory concentrations of bacteria cells in the biosynthesis bath which, disadvantageously, leads to high separation and drying costs occasioned by the necessity to centrifuge or otherwise separate the small amounts of bacteria cells from the large amounts of water, as well as unconverted hydrocarbons, inorganic salts, and the like, present in the biosynthesis bath as well as in the aqueous slurry effluent stream (product stream) thereof. The seriousness of undesirably low concentrations of bacteria cells combine with the relatively expensive nature of conducting suitable separation and drying procedures to concentrate with the bacteria cells and remove them from the aqueous media, is illustrated by expenditures which can amount to as much as 60% or higher of the total processing cost. Consequently, it is readily apparent that the provision of a long term continuous biosynthesis process will effect significant economic savings and reduce the cost of producing high protein foods by bacterial synthesis using hydrocarbon feeds as a relatively inexpensive source of both carbon and hydrogen.

The present invention is predicated on the use of certain monoolefinic, diolefinic, triolefinic, etc., unsaturated organic compounds, for example, olefins and carboxylic acids. In its broadest aspects, the present invention extends to the improved biosynthesis of all microorganisms, including bacteria and yeast, capable of growth on $C_1$–$C_{35}$ hydrocarbon feeds, including: $C_1$–$C_5$ gaseous paraffins, e.g., methane, ethane, propane and gases containing them; $C_6$–$C_{10}$ light naphthas, i.e., low boiling hydrocarbon oils of the $CnH_{2n+2}$ series having a boiling point of 95° to 150° C. as well as petroleum fractions containing same; and $C_{11}$–$C_{30}$ gas oils boiling in the range of 190° to 400° C. and petroleum fractions containing same.

In a preferred embodiment the feeds advantageously utilized for the present process are $C_{11}$–$C_{30}$ petroleum feeds, preferably gas oils boiling in the range of 190° to 400° C., preferably 190° to 320° C. Other preferred feeds are $C_1$–$C_{30}$ normal and isoparaffins, cycloparaffins, monoolefins, diolefins, and aromatics and mixture of these. Particularly preferred are normal paraffins. Feeds available in large quantities and those particularly suitable are $C_{11}$–$C_{30}$ normal paraffins from gas oils, light naphthas, and normally gaseous feeds such as methane, ethane and propane and mixtures of these such as natural gas. Where normally gaseous feeds are used these are, of course, preferably supplied as gases directly to the reactor through spargers. A most preferred embodiment of this invention involves the purification of any $C_6$–$C_{30}$ feed to reduce the level of aromatics both polycyclic and monocyclic to below 0.5 wt. percent, and preferably below 0.1 wt. percent. This is deemed necessary because it has been discovered that aromatics are not attacked by the microorganisms and when conventional separation procedures are used without such feed purification the product is extremely detrimental to animals and humans. By detrimental it is meant that these materials decrease the rate of growth of animals on these feeds. This is completely independent of the small amounts of polycyclic aromatics which are considered to be carcinogenic and which are preferably kept from the final product. These latter materials can be separated from the feed selectively by several processes but it is surprising that the amount of monocyclic aromatic which constitutes a significant part of the total aromatics, i.e., 20% to 50% must also be removed in order to allow the process to be useful. It is noted that a number of other processes described in the literature as being commercial or potentially commercial suggest extremely expensive surfactant washing, extracting and other procedures used on the product in order to obtain a good animal feed material.

The preferred process for purification of the hydrocarbon, preferably gas oil feed is a molecular sieve process. This process selectively absorbs the straight chain hydrocarbons on the molecular sieve and thus purifies them substantially completely from aromatics. A preferred method of carrying out this purification of gas oils process is described in U.S. 3,070,542 and the disclosure in this patent is hereby incorporated by reference as a preferred technique for purifying the feeds of the present invention. The essence of this patent is the finding that by preloading of the molecular sieve by the displacing medium along with the feed, the rate of adsorption is increased and subsequent desorption is greatly eased particularly with high molecular weight materials. It is also preferred to use an additional clean-up step as described in Ser. No. 223,078, now abandoned, filed Sept. 12, 1962 or Ser. No. 223,057, now abandoned, filed Sept. 12, 1962 and these specifications are hereby also incorporated by reference.

Suitable bacteria for use in the present process are any bacteria which will grow on hydrocarbons and which are not toxic to animals, selected from the class Schizomycetes and including the following subclasses.

I—Pseudomonadales
II—Chlamydrobacteriales
III—Hyphomicrobiales
IV—Eubacteriales
V—Actinomycetales
VI—Caryophonales
VII—Beggiatoales
VIII—Myxobacteriales
IX—Spirochaetales
X—Mycoplasmatales It is to be understood that the particular class and subclass of bacteria utilized is determined by the particular feed employed.

For example, when the microorganisms are grown on methane or other gaseous paraffin feeds, the preferred class of microorganism is Pseudomonadaceae, such as *Pseudomonas methanica*. When the biosynthesis is performed using a light naphtha feed, the preferred classes of microorganisms are Pseudomonadaceae and Arthrobacter, such as *Pseudomonas fluorescens, Pseudomonas desmolyticum, Pseudomonas aeruginosa* and *Arthrobacter globiforme*, and especially *Arthrobacter ureafaciens*.

In the preferred embodiment, the biosynthesis is conducted using a bacteria inoculant, especially, gram negative coccus bacteria; but yeasts can be employed, e.g., *Torulopsis magnolia* and *Candida albicans*.

While any aerobic, bacteria cells capable of assimilating normal $C_1$–$C_{35}$ hydrocarbon feeds can be employed in the practice of this invention, preferred bacteria are as follows: *Arthrobacter ureafaciens, Pseudomonas aeruginosa, Pseudomonas fluorescens, Nocardia opaca, Nocardia rubra, Nocardia coralina, Pseudomonas methanica, Pseudomonas desmolyticum, Mycobacterium phleie*. Especially preferred is *Arthrobacter ureafaciens*, isolated and identified by Dr. R. E. Kallio et al., Journal of Bacteriology, vol. 78, No. 3, pp. 441–448 (September 1959). Cultures of this organism have been deposited in the American Type Culture Collection, 212 M Street, NW., Washington 7, D.C., as No. 14987. The full identification of this material is as follows:

Morphology: Cells are small, spherical, tending to be elliptical in old cultures and in media high in nitrogen. Cells from defined media average 0.5 to 1.0 micron in diameter and from complex media 1.0 to 2.0 microns in diameter. Cells occur singly or in clumps. Non-motile, Metachromatic granules and sudanophilic granules are not observed.

Gram reaction: Negative.

Colonies on defined agar are small (1 mm.), circular, convex having entire edge. Colonies on nutrient agar are larger (2 to 5 mm.). Raised mucoid, generally round.

Pigmentation: White, beige, yellow or tan variants occur.

Obligately aerobic: A wide variety of materials support growth: yeast extract, casein hydrolyzate, long-chain alcohols and acids, long-chain normal alkanes and olefins.

Carbohydrate fermentation: No carbohydrates are fermented except dextrose. Aerobically, few carbohydrates are assimilated. These include glucose, rhamnose, sorbitol, dulcitol, and inulin. Aerobically, glucose is utilized with acid production. Gluconic acid has been identified.

Nitrate reduction: Negative.

Gelatin liquefaction: Generally negative. Slow liquefaction may occur in some strains.

Urea hydrolysis: Yes.

Catalase is produced.

Hydrogen is not utilized.

Optimum temperature is 30° C.

Optimum growth pH is 6.5 to 7.5.

Source: Iowa soil.

Habitat: Soils.

As noted previously, air is continuously introduced into the culture, preferably from the bottom of the reactor vessel through a sparger or other mechanical device suited to breakup the air into fine bubbles. The volume of air introduced can be from 0.1 to 10, and preferably from 0.5 to 2.0, volumes per minute per volume of biosynthesis liquid.

As previously mentioined, the reactor can be stirred during biosynthesis by a paddle stirrer, propeller-type stirrer or other agitator means to completely distribute the oxygen throughout the reactant culture biosynthesis medium. For example, paddle stirrers can be used having a horsepower rating of 1–20 per 1,000 gallons of reactant medium.

Nitrogen is essential to biosynthesis. The source of nitrogen can be an organic or inorganic nitrogen compound capable of releasing nitrogen in a form suitable for metabolic utilization by the microorganism being harvested. In the organic category, the following can be listed as exemplary nitrogen compounds: proteins, acid-hydrolyzed proteins, enzyme-digested proteins, amino acids, yeast extract, asparagine, urea, etc. For reasons of economy it is preferable to employ inorganic nitrogen compounds, such as: ammonia, ammonium hydroxide, or salts thereof such as ammonium citrate, etc. A very convenient and satisfactory method of supplying nitrogen is to add ammonium hydroxide. In this way, the pH range of 5.0 to 8.5 and preferably 7.0 and the requisite nitrogen intake which is supplied to the system can be readily controlled simultaneously. For this purpose, ammonia gas also can be bubbled directly into the biosynthesis bath which contains water. The ammonium hydroxide is supplied to the biosynthesis bath in amounts of 0.08 to 0.20, preferably 0.1 to 0.15 grams of nitrogen per gram of dried bacteria cells produced. This amounts to from 0.01 to 1.0 wt. percent and preferably from 0.1 to 0.15 wt. percent nitrogen based on total biosynthesis bath.

In addition to the energy and nitrogen sources, it is necessary to supply requisite amounts of selected mineral nutrients in the feed medium in order to maximize selectivity, viz, the conversion of hydrocarbons to bacteria cells. Thus, potassium, sulfur and phosphorus are required. These necessary materials can be supplied in the form of their salts, and preferably their water-soluble salts. For example, the potassium can be supplied as potassium chloride, phosphate, sulfate, citrate, acetate, nitrate, etc. Sulfur and phosphorus are usually supplied in the form of sulfates, and phosphates, respectively, such as alkali metal or ammonium sulfates and phosphates. The usually employed and preferred amounts of essential ions used in the froth flotation biosynthesis procedures of this invention to maximize selectivity are as follows:

| Salt | Ion | Usually employed weight percent ion supplied based on aqueous slurry | Preferred weight percent ion supplied based on aqueous slurry |
|---|---|---|---|
| $CaCl_2$ | $Ca^{++}$ | 0.001–0.10 | 0.001–0.01 |
| $FeSO_4 \cdot 7H_2O$ | $Fe^{++}$ | 0.0001–0.10 | 0.0002–0.005 |
| $KCl$ | $K^+$ | 0.01–0.20 | 0.03–0.15 |
| $MgSO_4$ | $Mg^{++}$ | 0.001–0.10 | 0.001–0.07 |
| $MnSO_4$ | $Mn^{++}$ | 0.001–0.05 | 0.0002–0.05 |
| $Na_2SO_4$, $NaCl$ | $Na^+$ | 0.001–0.1 | 0.02–0.06 |
| $H_3PO_4$ | $PO_4^{---}$ | 0.1–1.0 | 0.1–0.5 |
| (As above) | $SO_4^{--}$ | 0.001–0.1 | 0.03–0.06 |
| $NH_4Cl$, $NH_4OH$ | $NH_4^+$ | 0.01–1.0 | 0.05–0.15 |
| (As above) | $Cl^-$ | 0.001–0.1 | 0.01–0.02 |

In all the above, the essential mineral ions can be less preferably supplied in the form of other salts in amounts stoichiometrically the same (by calculation) to yield the ion concentrations as indicated above for the preferred salts.

The temperature of the culture during biosynthesis can be varied from about 20° to 55° C. When gram negative coccus bacteria, especially *Arthrobacter ureafaciens* are grown on $C_{11}$ to $C_{30}$ n-paraffins, the culture temperature is maintained at from 20° to 45° C., preferably 28° to 38° C. In maintaining proper temperature levels it is usually necessary to heat the system during early stages of start-up, whereas as the culture proceeds it will be observed that heat is generated in the culture and, hence, cooling is necessary to maintain the desired temperature. The cooling can be effected economically by utilizing cooling coils in the biosynthesis reactor vessel or by recycling a given portion of the aqueous slurry zone of the biosynthesis bath through a cooler.

The amount of hydrocarbon supplied to the biosynthesis bath based on aqueous salt medium supplied including ammonium hydroxide (viz, on an "as fed" basis) can range from 0.5 to 5 wt. percent, usually 0.5 to 2.0 wt. percent and preferably 1.0 to 1.5 wt. percent when straight air is employed as a source of oxygen. When using oxygen-enriched gases for example, air having 70+ wt. percent oxygen; the preferred amount of hydrocarbon supplied based on aqueous salt medium supplied (including ammonium hydroxide) is 2.0 to 5.0 wt. percent. The weight percent of $C_{11}$ to $C_{30}$ n-hydrocarbons actually existing in the slurry zone of the biosynthesis bath during growth can range from 0.01 to 1.0 wt. percent usually ranges from 0.01 to 0.1, and preferably ranges from 0.01 to 0.05 wt. percent (based on total biosynthesis bath), especially when the inoculant bacteria is *Arthrobacter ureafaciens*.

The residence time of the cells in the biosynthesis bath is much less than the residence time of the feed materials therein; and, usually in accordance with this invention the residence time of feed materials (and other non-cell biosynthesis bath contents) is 5 to 20 times as large as cell residence time. The term residence time as used herein means the reactor volume divided by the average throughput rate for each component.

Usually the mean residence time of the feed materials ranges from 5 to 60 hours and preferably from 10 to 20 hours, whereas the mean cell residence time ranges from 0.5 to 4 hours and preferably from 1 to 3 hours. Liquid residence time for the preferred bacteria, i.e., *Arthrobacter ureafaciens*, i.e., the volume of liquid in the reactor divided by the amount of feed materials supplied (and products removed so as to maintain a constant liquid level in the reactor) per hour is in general 0.5 to 10 hours, preferably 0.5 to 4 hours, more preferably 1.0 to 2.5 hours. These preferred residence times not only improve selectivity but also reduce $O_2$ requirements.

In accordance with the present invention, the growth promoting agents suitable for use of a mono-, di-, tri, etc., unsaturated organic compounds which impart a catalytic effect on the biosynthesis process. Illustrative of such compounds, are olefinic hydrocarbons and unsaturated acids. Thus, the present invention contemplates use of any catalytic compound containing one or more

groups which imparts a characteristic growth promoting action.

The olefins which suitably impart such growth promoting characteristic are monoolefins of the type:

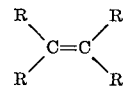

and diolefins of the type:

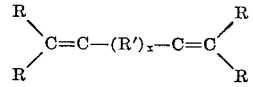

wherein R may be hydrogen or any aliphatic hydrocarbon group containing from about 1 to about 10 carbon atoms wherein R' may be any aliphatic hydrocarbon containing from about 1 to about 10 carbon atoms, and wherein $x$ represents an integer of from 0 to about 25. The preferred olefinic hydrocarbons contain from about 11 to about 30 carbon atoms per molecule. Non-limiting examples of typical compounds are propylene, butene-1 isobutylene, hexene, heptene, octene, nonene, decene, hexadecene, octadecene, eicosene, butadiene, piperylene, isoprene, 1,5-hexadiene, 1,4-octadiene, 2,2-dimethylbutadiene, and the like.

Illustrative of the carboxylic acids suitable for use in the biosynthesis process of the present invention are the acrylic acids, i.e.., acids of the type:

$$C_nH_{2n-1}COOH$$

the fumaric acids, i.e. acids of the type:

$$C_nH_{2n-2}(COOH)_2$$

wherein $n$ represents an integer of from 2 up to about 22. The preferred unsaturated carboxylic acids contain from about 8 to about 22 carbon atoms per molecule. Non-limiting examples of such acids include acrylic acid, the butenic acids, i.e., crotonic, isocrotonic, vinylacetic and methylacrylic acid, the pentenic acid, i.e., tiglic, angelic and senecioic acid, the hexenic acids, teracrylic acid, hypogeic acid, oleic acid, erucic acid, fumaric acid, maleic acid, glutaconic acid, citraconic acid, itaconic, hydromuconic acid, allylsuccinic acid, teraconic acid, the xeronic acids, e.g., suberic acid, azelaic acid, cetylmalenoic acid, and the like.

It is also contemplated by the present invention to employ mixtures of growth promoting olefins and carboxylic acids. In this embodiment a portion of one growth promoting additive is replaced by the one or more of the remaining operative growth promoting additives of this invention.

In order to insure obtaining the desired growth promoting factor, it is usual to employ the growth promoting agent or mixtures thereof in amounts of from about 0.001 to 0.6 wt. percent based on the total biosynthesis bath. Preferably, said agent is employed in amounts of from .01 to 0.2 wt. percent, specifically 0.03 wt. percent. Some extent of mechanical agitation in the form of stirring of the biosynthesis bath is helpful in order to disperse said agent and thus insure proper contact of the bacteria cells with said agent. The amount of mechanical agitation necessary to accomplish the desired objective is similar to that set forth above in that portion pertaining to agitation.

The *Arthrobacter ureafaciens* cells whose use is contemplated herein find utility as a food or feed supplement for animals and/or humans and, in addition, find utility as highly desirable adhesives.

The harvested cells can be recovered by centrifugation followed if desired, by drying, but neither centrifugation nor drying is required as the subsequent operations (lysing, basic extraction and isoelectric precipitation) can be carried out directly on a concentrated aqueous slurry of the *Arthrobacter ureafaciens* cells, e.g., as obtained by allowing the aqueous product stream from the biosynthesis bath to settle in a settling tank to obtain a concentrated aqueous slurry having from about 2 to about 12 weight percent cells. However, any suitable recovery procedure can be employed to gain the harvested cells from the aqueous slurry in which they are grown. Examples of other methods of winning the harvested cells are filtration, settling, with or without filter aids or coagulants, etc. The cells need not be rendered non-viable prior to extraction of the protein therefrom.

The recovered cells are then subjected to a lysing operation. Lysing can be accomplished by grinding the cells or by subjecting a concentrated aqueous slurry of cells to heat or supersonic waves or by contact for several hours with aqueous acetone. Usually, however, the harvested *Arthrobacter ureafaciens* cells are lysed by contact with aqueous acetone for time periods ranging from 1 to 5 hours, and usually 2 to 4 hours at ambient room temperatures, e.g., from 65 to 80° F. The term "aqueous acetone" as used herein includes water-acetone mixtures or solutions containing from 85 to 95 weight percent acetone, the remainder being water, e.g., either tap water or distilled water.

The lysed cells are then extracted with an aqueous basic solution to remove the protein from the remainder of the cell. The basic extraction can be conducted using any suitable base, e.g., sodium hydroxide, potassium hydroxide, sodium sulfite, "Borax," ammonium acetate, etc. The normality of the aqueous base solution can range from 0.05 to 5.0 N, usually ranges from 0.1 to 1.0 N, and preferably ranges from 0.1 to 0.5 N. The basic extraction can be accomplished at pH values ranging from 8 to 12, usually ranging from 9 to 11, and preferably at a pH of approximately 9.5 to 10.5. The basic extraction is conducted at temperatures ranging from 20° C. to 40° C., usually from 22° C. to 35° C., and preferably from 25° C. to 29° C. for time periods of from about 0.5 to 10 hours, usually 1 to 6 hours, and preferably from 2 to 4 hours. Then the extracted protein is subjected to centrifugation to remove insoluble debris present in the extract. The insoluble debris by-product contains 9 to 11 percent by weight nitrogen and can be used as by-product feed for animals.

After removal of the insoluble debris by centrifugation, filtration or any other suitable removal technique, the extracted protein is isoelectrically precipitated by adjusting the pH of the basic extract to an acidic pH ranging from 5.2 to 3.2, usually from 4.5 to 3.8, and preferably to an acid pH of approximately 4.1 using any suitable acid. Suitable exemplary acids for isoelectric precipitation of the base extracted bacterial protein include, but are not limited to, the following: sulfuric acid, sulfurous acid, phosphoric acid, hydrochloric acid, etc. The normality of the acid used for precipitation usually ranges from 2 to 10 N and preferably from 4 to 6 N, but an acid of any normality can be used to adjust the pH to the above mentioned level.

The precipitated protein curd is then collected by centrifugation, washed with water and then dried. Any convenient drying procedure can be employed, e.g., a drum-type drier or spray drier can be used. Alternatively, the precipitated protein curd can be dried by slurrying in acetone followed by air drying at temperatures of 25 to 33° C. Yield of 35 to 55 percent of usable protein extract are uniformly realized (based upon dried cell weights). Of course, the exact yield of usable protein extract obtained will depend in part upon the protein content of the original harvested *Arthrobacter ureafaciens* cells.

The material obtained by the above mentioned lysing, basic extraction, and isoelectric precipitation procedures is a high-protein containing material having a protein concentration ranging from 70 to 95 weight percent protein, usually 70 to 89 weight percent protein, and preferably contains 89+ weight percent pure protein.

A typical analysis (moisture-free basis) of the dried protein extract obtained in the manner set forth hereinabove from harvested *Arthrobacter ureafaciens* bacteria cells is as follows: percent C=46–48; percent H=6.5–7.8; percent N=13.9–14.9; percent ash=1–5; percent protein=70–93; percent moisture=9–10; percent acidity=2–3.

The physical properties of a typical sample of protein extracted from *Arthrobacter ureafaceins* cells are tabulated hereinbelow:

| Properties: | Values |
| --- | --- |
| Total nitrogen (percent by weight) | 14.4±0.5 |
| Moisture content (percent by weight water) | 9.5±0.5 |
| Alkali requirement to solubilize protein extract (grams of sodium hydroxide per 100 grams of protein extract) | 4.7±0.8 |
| Free acidity (ml. of 0.1 N sodium hydroxide/gram to neutralize) | 0.5±0.1 |

The dried bacteria protein extract may then be formulated into an adhesive solution or suspension in order to be readily coated, sprayed, flowed, screened or otherwise deposited upon the paper, wood, or other surface for which it is to be employed as a binder or adhesive.

The present invention will be understood more clearly from the consideration of the following examples.

EXAMPLE I

*Arthrobacter ureafaciens* were grown on an essentially $C_{16}$ n-paraffin hydrocarbon containing about 10 p.p.m. aromatics. The composition of the inorganic salts solution utilized was as follows:

| Mineral salt: | Feed level, weight |
| --- | --- |
| $CaCl_2$ | 0.025 |
| $FeSO_4 \cdot 7H_2O$ | 0.004 |
| $KCl$ | 0.10 |
| $MgSO_4$ | 0.025 |
| $Na_2SO_4$ | 0.05 |
| 85% $H_3PO_4$ | 0.25 |
| Water | 99.5 |
| Total | 99.954 |

The growth conditions established prior to feeding the slurry to the continuous reactor were as follows:

Air rate—4 liters/minute
$C_{16}$ hydrocarbon feed rate—20 g./hr.
Mineral salts feed rate—2 liters/hr.
13 N ammonium hydroxide—Fed on demand to control pH
Temperature—30°–37° C.
Agitation—350–1500 r.p.m.

About 2 liters/hr. of approximately 0.5% by weight solids aqueous slurry produced as outlined above was fed to a vessel suitable for continuous reaction having a volume of 7.5 liters in which *Arthrobacter ureafaciens* was growing at steady state. About 0.2 gram/hr., i.e., 0.01 wt.

percent, of oleic acid was added to the aqueous slurry feed. Sufficient air was then bubbled through the aqueous slurry. The experiment was conducted at temperatures of 30 to 37° C. The pH was maintained at a pH of approximately 7.0 throughout the run. The air rate was 22 cc./min./cm² or reactor cross-section and the agitation was effected at 800 r.p.m.

At a steady state, representative samples were taken from the reactor vessel. These samples analyzed for bacteria cell and hydrocarbon concentration. In order to demonstrate the feasibility of the instant invention to yield bacteria concentrations substantially exceeding those obtainable in conventional biosynthesis baths (where no growth promoting agent was utilized), a biosynthesis was accomplished essentially identical to the foregoing save for the absence of oleic acid. The results are shown below for comparative purposes:

| Additive: | Cell concentration, g./l. |
|---|---|
| Oleic acid | 14.4±1 |
| None | 12.6±1 |

EXAMPLE II

The following example was effected to evaluate growth promoters of this invention in a continuous operation.

A run in which *Arthrobacter ureafaciens* had been grown continuously in a manner similar to that of Example I and for a duration greater than 300 hours was completed. In this run, oleic acid and 1-hexadecene were studied at various feed levels. A summary of the results with a 1 wt. percent total hydrocarbon feed is shown in the following table.

Effect of growth promoters

| Additive (feed conc., wt. percent): | Cell growth rate (g./hr.) |
|---|---|
| 0.1% oleic acid | 19.0±1 |
| 0.01, 0.02, 0.03% oleic acid | 16.4–19.5 |
| 0.1, 0.01% 1-hexadecene | 16.6±1 |
| After additive removal | 12.6±1 |

From the foregoing data it can be concluded that oleic acid and 1-hexadecene are effective as growth promoters. Additionally, the data show that 0.1 wt. percent oleic acid evidences slightly better results than 0.01–0.03 wt. percent oleic acid.

EXAMPLE III

In a manner similar to that of the preceding examples, azelaic acid was employed as a growth promoter and was compared with a run employing no promoter. Comparative data resulting show that *Arthrobacter ureafaciens* when grown on $C_{16}$ hydrocarbon feed stock with 50 p.p.m. of azelaic acid added to the medium stimulated growth and hydrocarbon utilization of the bacteria in a 48 hr. period.

EXAMPLE IV

In a manner similar to the preceding examples, decene is successfully employed as a growth promoter for a feed stock comprising a $C_{10}$–$C_{35}$ hydrocarbon.

EXAMPLE V

In a manner similar to the preceding examples, eicosene is successfully employed as a growth promoter for a feed stock comprising a $C_{10}$–$C_{35}$ hydrocarbon.

EXAMPLE VI

In a manner similar to the preceding examples, suberic acid is successfully employed as a growth promoter for a feed stock comprising a $C_{10}$–$C_{35}$ hydrocarbon.

While the foregoing examples have illustrated this invention in great detail, it should be realized that the present invention in its broadest aspects is not necessarily limited to the specific materials, reaction conditions, etc., as set forth therein.

What is claimed is:

1. In a process for the preparation of a high protein-content product which comprises supplying a $C_1$–$C_{35}$ hydrocarbon, a nonlimiting liquid aqueous inorganic salts growth medium and excess oxygen containing gas to a vigorously stirred reactor containing said hydrocarbon, aqueous medium and a bacteria capable of growing on said hydrocarbon, removing a mixture of bacteria, aqueous medium, and unconverted hydrocarbon, and separating the bacteria to obtain directly an excellent animal food the improvement which comprises adding a catalytic amount of an unsaturated organic compound selected from the class consisting of acrylic acid, fumaric acid and oleic acid to said reactor.

2. The process of claim 1 in which the hydrocarbon is a $C_{11}$–$C_{30}$ petroleum feed.

3. The process of claim 1 wherein the bacteria utilized is *Arthrobacter ureafaciens*.

4. The process of claim 1 wherein the temperature utilized is within the range of from 20° to 55° C.

5. The process of claim 1 wherein the amount of hydrocarbon supplied to the reactor ranges from 0.5 to 5 wt. percent based on the aqueous inorganic salt growth medium.

6. The process of claim 1 wherein the residence time of the feed materials in said reactor ranges from 5 to 60 hours.

7. A process for preparing a high protein food which comprises continuously supplying a mixture of 0.1 to 10 wt. percent of a 190° to 400° C. normal paraffin feed containing less than 0.1 wt. percent aromatics in an inorganic salts aqueous growth medium, an oxygen containing gas and from 0.1 to 10 wt. percent (based on paraffin feed) of an unsaturated organic compound selected from the class consisting of acrylic acid, fumaric

|  | Grams/l. | Utilized percent | 17 Grams of C ||||
|---|---|---|---|---|---|---|
|  |  |  | Present C used | Grams of C as cells | Grams of $CO_2$ | $CO_2$ percent as chemicals |
| Azelaic with $C_{16}$ olefin | 7.7 | 74 | 11.84 | 3.5 | 5.9 | 2. |
| $C_{16}$ | 5.5 | 34 | 5.0 | 2.7 | 2.8 |  |

From the foregoing it can be seen that azelaic acid stimulated growth of the *Arthrobacter ureafaciens* by 24% over that of the control. It also increased the amount of hydrocarbon utilized and thus allowed more carbon to go to chemicals. It is noteworthy that the concentration of azelaic acid required was only 50 p.p.m. and, advantageously, this concentration would not influence the total cost of product produced.

acid and oleic acid to a stirred reactor inoculated with *Arthrobacter ureafaciens*, continuously removing a mixture of bacteria, aqueous medium and unconverted paraffin, separating bacteria containing 80 to 95 wt. percent liquid based on dry cells, and drying the bacteria to obtain directly said food.

8. The process of claim 7 in which reactor residence time is 1 to 2 hours, the mixture supplied contains 4 to 8 wt. percent of the normal paraffin and the oxygen enriched air contains 70+ percent oxygen, the amount of oxygen supplied is 1.5 to 2.5 lbs. per lb. of product dried bacteria recovered per unit time and the inorganic salts aqueous growth medium is supplied in the following amounts, in each case wt. percent salt supplied based on product dried bacteria recovered per unit time; 0.05 to 0.25 wt. percent $H_3PO_4$, 0.025 to 0.05 wt. percent $Na_2SO_4$, 0.05 to 0.10 wt. percent KCl, 0.02 to 0.05 wt. percent $MgSO_4$, 0.02 to 0.05 wt. percent $CaCl_2$, 0.005 to 0.02 wt. percent $FeSO_4$ and 0.005 to 0.02 wt. percent $MnSO_4$.

References Cited

UNITED STATES PATENTS

| 3,264,196 | 8/1966 | Filosa | 195—96 X |
| 3,293,145 | 12/1966 | Leavitt et al. | |
| 3,355,296 | 11/1967 | Perkins et al. | 195—3 X |

A. LOUIS MONACELL, Primary Examiner

J. L. WINDE, Assistant Examiner

U.S. Cl. X.R.

195—28, 96, 100, 102